United States Patent
Kimura et al.

(10) Patent No.: US 8,097,986 B2
(45) Date of Patent: Jan. 17, 2012

(54) MICRO ACTUATOR

(75) Inventors: Yoshihiro Kimura, Tokyo (JP);
Toshiyuki Aso, Tokyo (JP); Yoshinobu Tanaka, Tokyo (JP); Hidekazu Michioka, Tokyo (JP); Makoto Iizumi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 680 days.

(21) Appl. No.: 12/065,370

(22) PCT Filed: Aug. 29, 2006

(86) PCT No.: PCT/JP2006/316937
§ 371 (c)(1),
(2), (4) Date: Jan. 8, 2009

(87) PCT Pub. No.: WO2007/026673
PCT Pub. Date: Mar. 8, 2007

(65) Prior Publication Data
US 2009/0152960 A1    Jun. 18, 2009

(30) Foreign Application Priority Data
Aug. 31, 2005  (JP) ................................. 2005-250607

(51) Int. Cl.
*H02K 41/02*  (2006.01)
(52) U.S. Cl. ................ 310/12.17; 310/12.01; 310/12.24
(58) Field of Classification Search .... 310/12.01–12.33, 310/12–14
See application file for complete search history.

(56) References Cited

U.S. PATENT DOCUMENTS

| | | | |
|---|---|---|---|
| 5,913,091 A * | 6/1999 | Nanba et al. | 399/32 |
| 5,990,583 A | 11/1999 | Nanba et al. | |

FOREIGN PATENT DOCUMENTS

| | | | |
|---|---|---|---|
| JP | 3-285554 | A | 12/1991 |
| JP | 07-170710 | A | 7/1995 |
| JP | 9-1823408 | A | 7/1997 |
| JP | 10-272419 | A | 10/1998 |
| JP | 10-323008 | A | 12/1998 |
| JP | 2003-278873 | A | 10/2003 |
| JP | 2003278873 | A * | 10/2003 |

OTHER PUBLICATIONS

International Search Report for PCT/JP2006/316937 dated Nov. 21, 2006.

* cited by examiner

*Primary Examiner* — Quyen Leung
*Assistant Examiner* — Leda Pham
(74) *Attorney, Agent, or Firm* — Westerman, Hattori, Daniels & Adrian, LLP (57) ABSTRACT

Disclosed is a micro actuator capable of being formed in compact as a whole, such as 10 mm in diameter by diminishing a difference between a stroke distance of a moving member and an overall length, and by reducing a sectional area taken in a direction orthogonal to a stroke direction. The micro actuator includes: a spline shaft formed as a cylinder with a hollow part and having an axially extending slit opening; a spline nut fit-engaged with the spline shaft and axially guiding the spline shaft; a pair of end caps fixed to openings at both ends of the spline shaft; a magnet rod supported at both ends within the hollow part of the spline shaft by the end caps; and a forcer loosely fit-engaged with a periphery of the magnet rod within the hollow part of the spline shaft to constitute a linear motor together with the magnet rod and connected with the spline nut through the slit opening.

5 Claims, 7 Drawing Sheets

MICRO ACTUATOR

TECHNICAL FIELD

The present invention relates to an actuator with a built-in driving means, in which a spline shaft and a spline nut can move relative to each other in response to an input signal. In particular, the present invention relates to a micro actuator capable of being downsized into about 10 mm in diameter, and being used for various industrial appliances.

BACKGROUND ART

Hitherto, a linear actuator, which converts an electric input signal into a linear movement of a moving member and outputs the same, mainly includes a guide mechanism for linearly guiding the moving member while bearing an external force, and a drive mechanism for causing the moving member to advance and retreat along the guide mechanism. There are various known examples of the drive mechanism, including a linear actuator which uses a hydraulic cylinder or an air cylinder as the drive source, and which transmits a linear reciprocating motion of a piston as it is to the moving member, and an actuator which uses a motor as the drive source and which converts a rotary motion of the motor to a linear motion by using a ball screw. Further, a linear actuator is also known which uses as the drive source a linear motor including a stator and a moving element and which transmits a linear reciprocating motion of the linear motor as it is to the moving member.

While there are various combinations of the drive mechanism and the guide mechanism according to the requisite thrust for the moving member, load bearing capacity, moving speed, precision, etc., simply combining an arbitrary drive mechanism and guide mechanism results in a linear actuator of a rather large size, which leads to a rather poor usability.

JP 2003-278873 A discloses a linear actuator of a relatively compact structure in which the drive mechanism is contained in the guide mechanism. In this linear actuator, a ball screw made up of a screw shaft and a ball nut are accommodated in a cylindrical housing having a hollow part, and the screw shaft is rotatably supported within the hollow part. A motor is fixed to one end of the cylindrical housing, and it is possible to impart an arbitrary rotation to the screw shaft by this motor. Further, an axially extending spline groove is formed in the outer peripheral surface of the housing; a cylindrical moving member is fit-engaged with the outer side of the housing through the intermediation of the spline groove, and the cylindrical moving member is freely movable in the axial direction of the housing while prevented from rotation relative to the housing. Further, the housing has a slit-like opening extending in the axial direction, and the ball nut of the ball screw is connected with the moving member through the intermediation of this opening.

In the actuator constructed as described above, when the motor is rotated to impart an arbitrary rotation to the screw shaft contained in the hollow part of the housing, the ball nut moves within the hollow part upon the rotation of the screw shaft, and, on the outer side of the housing, the cylindrical moving member moves in the axial direction together with the ball nut. Thus, it is possible to move the cylindrical moving member along the axis of the housing in an arbitrary direction and by an arbitrary amount according to the rotating direction and the rotating amount of the motor, respectively.

Patent Document 1: JP 2003-278873 A

DISCLOSURE OF THE INVENTION

Problems to be Solved by the Invention

However, the accommodation of the ball screw in the housing involves the following problem: since the ball nut, which is threadedly engaged with the screw shaft, is equipped with an endless ball circulation path, its diameter cannot be reduced to an extreme degree, and the diameter of the housing accommodating the ball nut in the hollow part is inevitably rather large. Further, the motor for driving the screw shaft is fixed to one longitudinal end of the housing through the intermediation of a bracket, so the difference between the stroke distance of the cylindrical moving member and the overall length of the linear actuator is inevitably rather large, and even when the requisite stroke distance in accordance with the purpose thereof of the moving member is small, the overall length of the linear actuator cannot be reduced so much. Further, the screw shaft must be supported at both ends by bearings, which have to be fixed in position while accommodated in the hollow part of the housing, so the operation of assembling the screw shaft to the housing takes a lot of time and effort; further, the number of components involved is large, resulting in a rather high cost.

Means for Solving the Problems

The present invention has been made in view of the above-mentioned problems, and therefore has an object to provide a micro actuator capable of being formed in compact as a whole, such as 10 mm in diameter, by diminishing a difference between a stroke distance of a moving member and an overall length and by reducing a sectional area taken in a direction orthogonal to a stroke direction.

Another object of the present invention is to provide a micro actuator which includes a smaller number of components, and can be assembled easily.

In order to achieve the above-mentioned objects, a micro actuator according to the present invention includes: a spline shaft formed as a cylinder with a hollow part and having an axially extending slit opening; a spline nut fit-engaged with the spline shaft and axially guiding the spline shaft; a pair of end caps fixed to openings at both ends of the spline shaft; a magnet rod supported at both ends within the hollow part of the spline shaft by the end caps; and a forcer loosely fit-engaged with a periphery of the magnet rod within the hollow part of the spline shaft to constitute a linear motor together with the magnet rod and connected with the spline nut through the slit opening.

Both ends of the magnet rod are fit-engaged with the end caps, which are fixed to the end openings of the spline shaft, whereby the magnet rod is supported in the hollow part of the spline shaft. The forcer contains a coil member; when an electric signal is applied to the coil member, the forcer is axially thrust within the hollow part of the spline shaft while loosely fit-engaged with the magnet rod. As a result, the spline nut, which is connected with the forcer through a slit opening of the spline shaft, is thrust axially on the outer side of the spline shaft.

In the micro actuator of the present invention, constructed as described above, the end openings of the spline shaft are stopped by the pair of end caps, whereby the magnet rod is supported in the hollow part of the spline shaft, and the linear motor as the drive mechanism is completely accommodated in the spline shaft as the guide mechanism. As a result, it is possible to diminish the difference between the stroke length of the spline nut and the overall length of the actuator. Further, due to the use of a so-called rod type linear motor, in which the forcer is loosely fit-engaged with the periphery of the magnet rod, a sufficient thrust can be obtained even if the forcer is downsized, making it possible for the diameter of the spline shaft, which accommodates the forcer in the hollow part thereof, to be set small. As a result, according to the present invention, it is possible to obtain a linear actuator markedly downsized, that is, a micro actuator.

Further, as described above, in the micro actuator of the present invention, the magnet rod constituting the linear motor is fixed to the spline shaft by a pair of end caps, and the assembly operation is substantially completed solely by connecting the forcer with the spline nut, so the number of components is relatively small, and the assembly can be conducted easily, thus allowing production at a lower cost.

DESCRIPTION OF REFERENCE NUMERALS

1 . . . spline shaft, 2 . . . spline nut, 3 . . . linear motor, 5 . . . end cap, 12, 13 . . . slit opening, 30 . . . magnet rod, 31 . . . forcer

BEST MODE FOR CARRYING OUT THE INVENTION

In the following, the micro actuator of the present invention will be described in detail with reference to the accompanying drawings.

Figure 1:
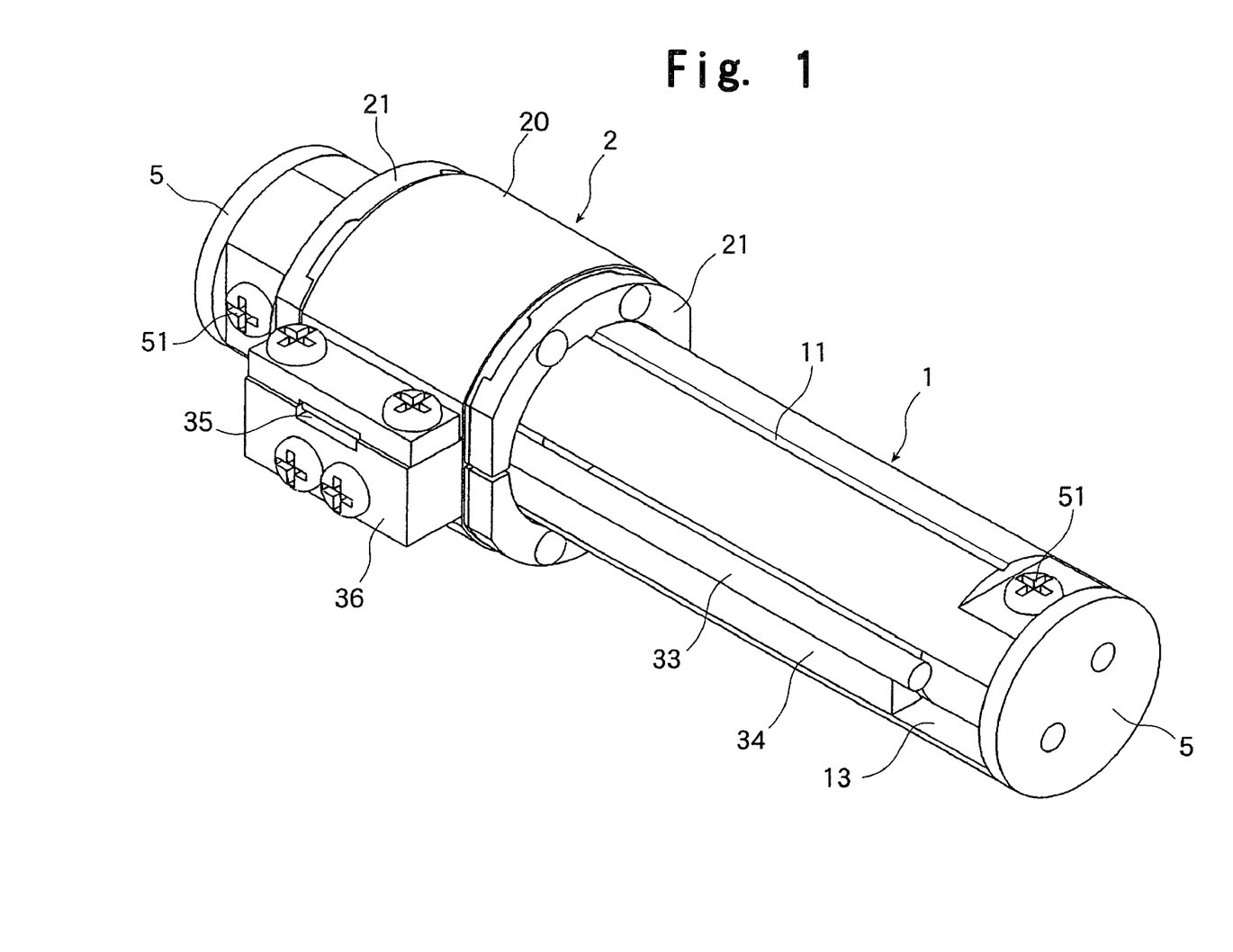
FIG. 1 is a general perspective view of a micro actuator according to a first embodiment of the present invention.
Figure 2:
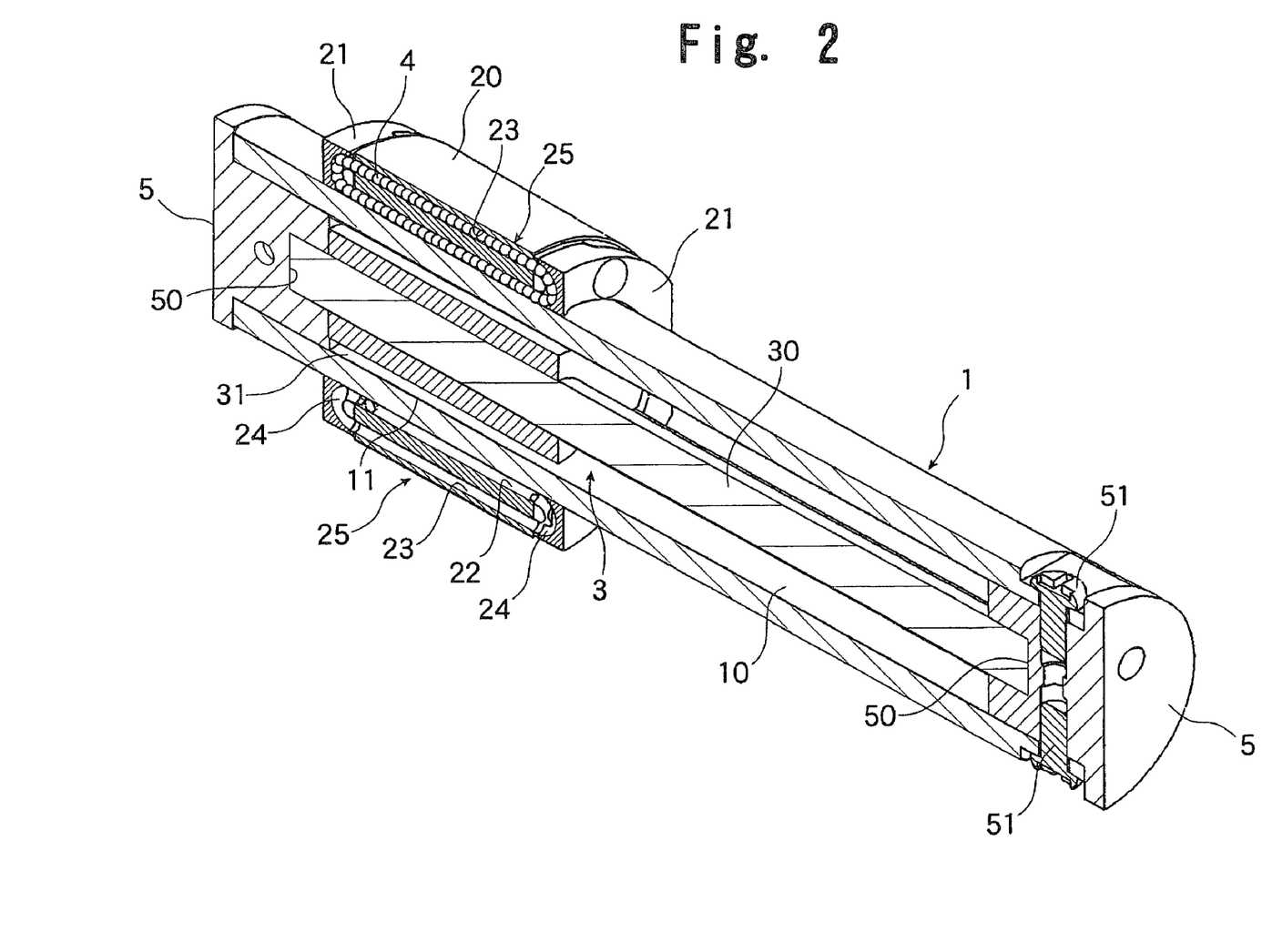
FIG. 2 is a vertically cutaway longitudinal perspective view of the micro actuator shown in FIG. 1.
Figure 3:
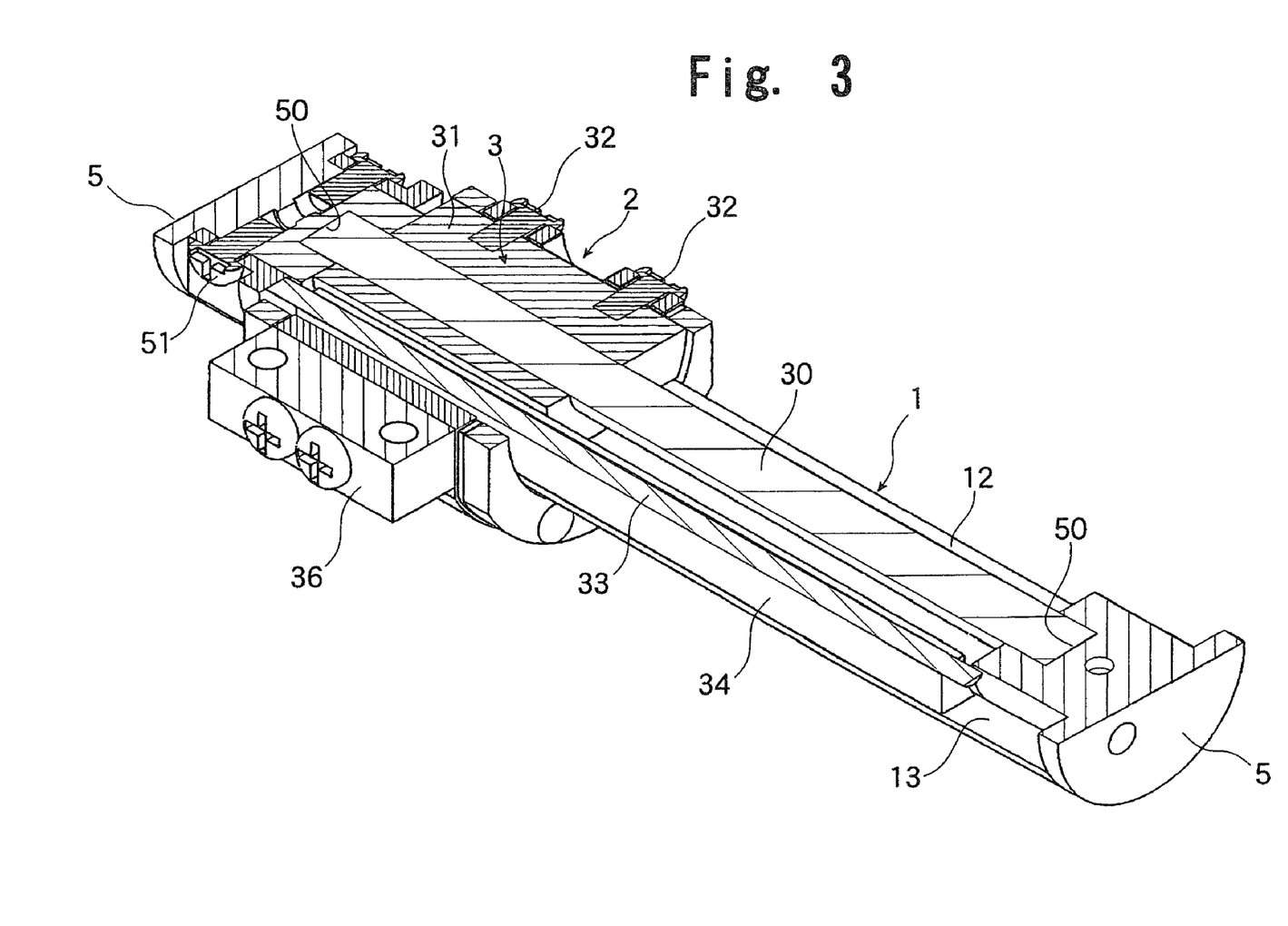
FIG. 3 is a horizontally cutaway longitudinal perspective view of the micro actuator shown in FIG. 1.
Figure 4:
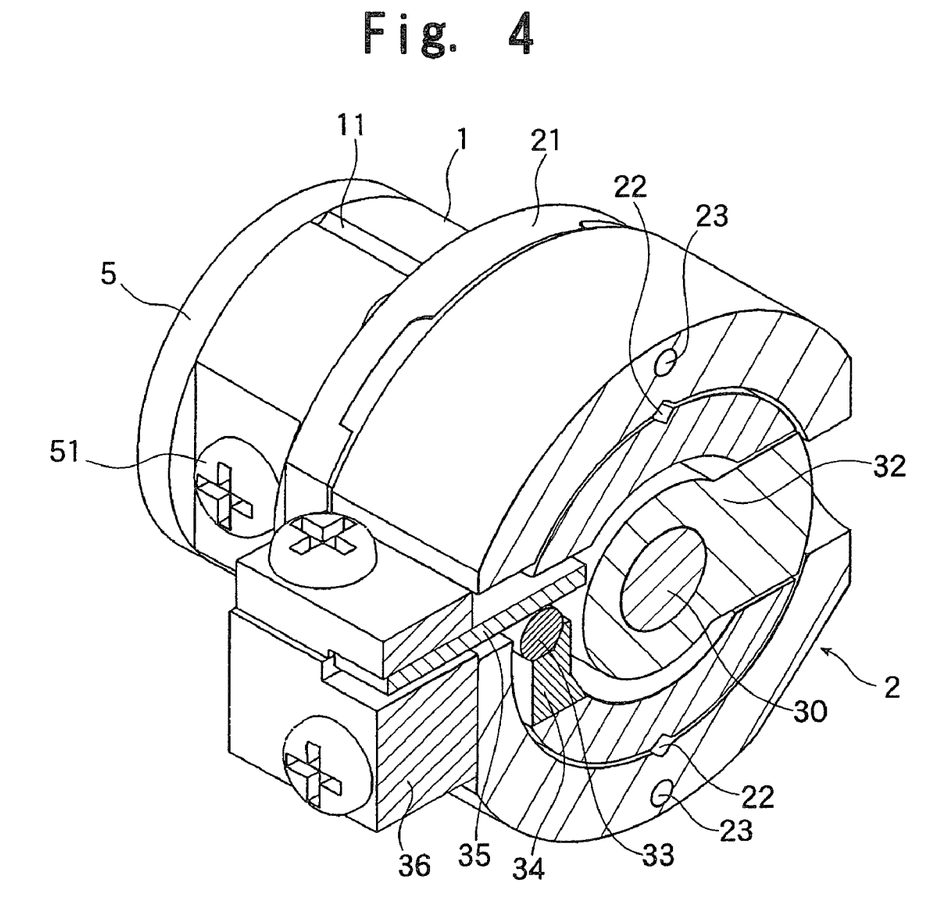
FIG. 4 is a perspective view of the micro actuator shown in FIG. 1, cut away in a direction perpendicular to the longitudinal direction at the center of the spline nut.

FIGS. 1 through 4 show a micro actuator according to the first embodiment of the present invention. FIG. 1 is a general perspective view, FIG. 2 is a vertically cutaway longitudinal perspective view, FIG. 3 is a horizontally cutaway longitudinal perspective view, and FIG. 4 is a perspective view cut away perpendicularly to the longitudinal direction at the center of a spline nut described below. This micro actuator is equipped with a spline shaft 1 having a hollow part 10 and formed in a substantially cylindrical configuration, and a spline nut 2 fit-engaged with the outer side of the spline shaft 1 through the intermediation of a large number of balls, and is capable of reciprocating the spline nut 2 in the axial direction of the spline shaft 1 by utilizing thrust generated by a linear motor 3 accommodated in the hollow part 10 of the spline shaft 1.

The spline shaft 1 has the hollow part 10 and is formed in a cylindrical configuration, with the outer peripheral surface thereof having two ball rolling grooves 11 out of phase with respect to each other by 180°. Further, the spline shaft 1 is equipped with a pair of axially extending slit openings 12, 13 out of phase with respect to the ball rolling grooves 11 by 90°.

The slit openings 12, 13 are opposed to each other with the hollow part 10 therebetween, and establish communication between the interior and exterior of the spline shaft 1. In an actual prototype, the outer diameter of the spline shaft 1 is approximately 7 mm, and the inner diameter thereof is approximately 5 mm.

The spline nut 2 is substantially formed as a cylinder whose inner diameter is slightly larger than the spline shaft 1; it is fit-engaged with the outer side of the spline shaft 1 through the intermediation of a large number of balls 4 rolling in the ball rolling grooves 11 of the spline shaft 1. The spline nut 2 includes a nut main body 20 and a pair of end plates 21 fixed to both axial end surfaces of the nut main body 20.

Formed in the inner peripheral surface of the nut main body 20 are load rolling grooves 22 opposed to the ball rolling grooves 11 of the spline shaft 1, and the balls 4 roll between the ball rolling grooves 11 and the load rolling grooves 22 while bearing load. Further, the nut main body 20 has ball return paths 23 parallel to the load rolling grooves 22, with the ball return paths 23 being situated so as to radially overlap the load rolling grooves 22. The endless plates 21 have direction changing paths 24 allowing the balls 3 to come and go between the load rolling grooves 22 and the ball return paths 23 of the nut main body 20; when the spline nut 2 is assembled, with the pair of end plates 21 being fixed to the axial end surfaces of the nut main body 20, the spline nut 2 is provided with endless circulation paths 25 for the balls 4. While in FIG. 2 the balls 4 are only arranged in one of the two endless circulation paths 25 formed to be situated at positions opposed to each other with the spline shaft 1 therebetween, the balls 4 are actually also incorporated to occupy the entire periphery of the endless circulation path where no balls 4 are depicted.

Thus, when the spline nut 2 is moved along the spline shaft 1, the balls 4 circulate through the endless circulation paths 25 while bearing load between the nut main body 20 and the spline shaft 1, making it possible for the spline nut 2 to move continuously along the spline shaft 1. The spline nut 2 is equipped with a screw hole at a position on the back side as seen in FIG. 1, and this screw hole is threadedly engaged with a fixation screw, whereby it is possible to fix the spline nut 2 to some other machine, apparatus or the like. Thus, in this micro actuator, the spline nut 2 is fixed in position, and the spline shaft 1 supported by the spline nut 2 is caused to advance and retreat in the axial direction. In an actual prototype, steel balls having a diameter of 0.4 mm are used as the balls 4.

Inside the hollow part 10 of the spline shaft 1, there is accommodated a magnet rod 30 serving as the stator of the linear motor 3. In the magnet rod 30, the N-poles and S-poles of permanent magnets are alternately arranged in the axial direction; it may be produced by stuffing the interior of a steel pipe with a large number of permanent magnets, or it may be formed by shaping a round bar and creating magnetic poles through magnetization afterwards.

A pair of end caps 5 are fit-engaged with openings at both axial ends of the spline shaft 1, whereby the hollow part 10 of the spline shaft 1 is axially closed. Each of those end caps 5 has at the center thereof a retaining hole 50 to be fit-engaged with the end portion of the magnet rod 30; by fixing the pair of end caps 5 to the spline shaft 1, the magnet rod 30 is retained in a center-crank-like fashion within the hollow part 10 of the spline shaft 1, and is set in position parallel to the axial direction of the spline shaft 1, that is, the moving direction of the spline nut 2. In the drawings, numeral 51 indicates fixation screws for fixing the end caps 5 to the spline shaft 1.

Further, a forcer 31 constituting the linear motor 3 is loosely fit-engaged with the periphery of the magnet rod 30 with a slight gap therebetween. This forcer is formed of aluminum, which is superior in thermal conductivity, and has a hollow part through which the magnet rod is passed, with the inner peripheral surface of the hollow part accommodating exciting coils (not shown) as a stator. The exciting coils include a coil group in which three coils of U-, V-, and W-phase constitute one set. The exciting coils of all phases are of a ring-like configuration, and are opposed to the outer peripheral surface of the magnet rod 30 through the intermediation of a slight gap. The arrangement pitch of the exciting coils of the different phases is set smaller than the arrangement pitch of the permanent magnets of the magnet rod. Formed in the magnet rod 30 is a magnetic flux extending from the S-pole toward the N-pole, and the coil member contains a magnetic pole sensor (not shown) for detecting the magnetic flux density. Thus, the positional relationship of the magnetic poles (N- and S-poles) of the magnet rod with respect to the exciting coil can be understood from a detection signal output from this magnetic pole sensor. A controller controlling the energization of the exciting coils receives the detection signal from the magnetic pole sensor, and computes an optimum electric current corresponding to the positional relationship between the exciting coils and the magnetic poles of the magnet rod, supplying that current to the exciting coils. As a result, due to the synergistic effect of the electric current flowing through the exciting coils and the magnetic flux formed by the permanent magnets, an attractive force and a repulsive force are generated between the exciting coils and the magnetic poles of the permanent magnets, with the result that the forcer 31 is propelled in the axial direction of the magnet rod 30.

As shown in FIG. 3, a part of the forcer 31 is inserted into one slit opening 12 of the spline shaft 1, and is connected with the spline nut 2 by fixation screws 32. As a result, when the forcer 31 is propelled in the axial direction of the magnet rod 30, the spline nut 2 is propelled in the axial direction of the spline shaft 1.

Further, as shown in FIGS. 1 and 3, a linear scale 33 is arranged parallel to the axial direction of the spline shaft 1 within the other opening 13 of the spline shaft 1. The linear scale 33 is formed as a magnet scale, in which N and S magnetic poles are alternately arranged in a metal wire of a circular sectional configuration. This linear scale is fixed in position within the slit opening 13 by using a pedestal 34.

Further, as shown in FIG. 4, a reading head 35 for detecting the magnetic poles of the linear scale 33 is inserted into the slit opening 13 from the outer side of the spline shaft 1, and the reading head 35 is fixed to the spline nut 2 through the intermediation of a bracket 36. As a result, when the spline nut 2 moves along the spline shaft 1, the reading head 35 outputs pulse signals corresponding to changes in the magnetic poles as it moves along the linear scale 33, and, by monitoring the pulse signals, it is possible to detect the moving amount of the spline nut 2 with respect to the spline shaft 1. It is not necessary for the linear scale 33 to be formed as a magnet scale; it may also be formed, for example, as one with a ladder-like pattern, which is read by an optical method.

In this micro actuator constructed as described above, the linear motor 3 as the drive mechanism can be completely built in the hollow part of the spline shaft 1, thus making it possible to obtain a very compact actuator while uniting the drive mechanism and the guide mechanism with each other. In particular, regarding the overall axial length of the spline shaft 1, the magnet rod 30 constituting the linear motor 3 is supported at both ends by the pair of end caps 5, so there is no great difference between the stroke distance of the spline nut 2 and the overall length of the spline shaft 1, making it possible to markedly reduce the overall axial length of the actuator. Further, it has been found out that the number of components involved is small and that the assembly is very easy to perform, thus allowing production at low cost.

In an actual prototype of the actuator, the overall length is 35 mm, the maximum diameter of the spline nut 2 inclusive of the bracket 36 is 12.2 mm, and the stroke distance of the spline nut 2 is 17 mm. The maximum moving speed of the spline nut 2 is 762 (mm/s).

While in the example shown in FIGS. 1 through 4 a pair of slit openings 12, 13 are formed in the spline shaft 1, it is also possible to form a single slit opening in the spline shaft 1 through appropriate modification of the arrangement position of the linear scale 33, whereby it is possible to achieve a further reduction in production cost.

Figure 5:
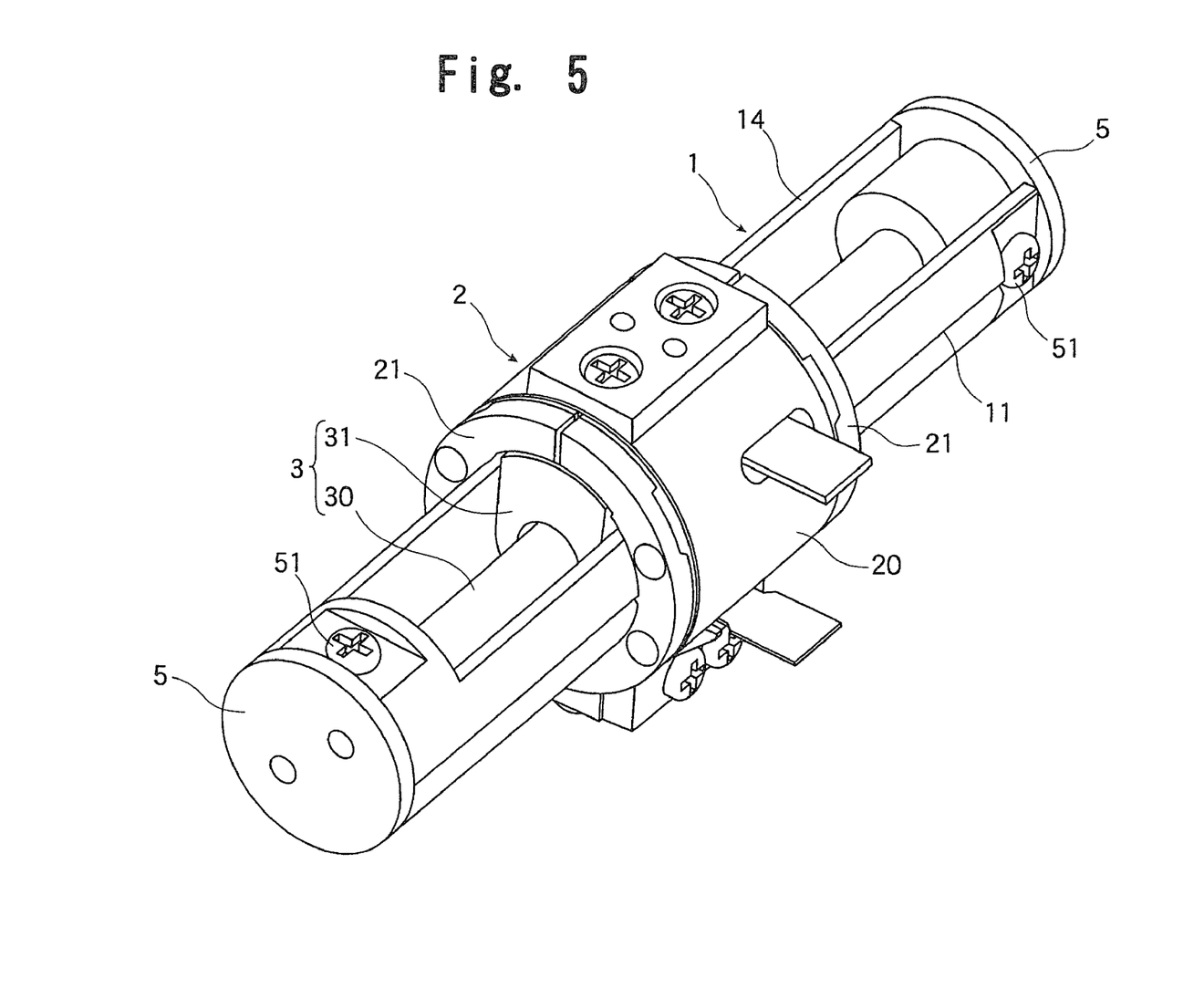
FIG. 5 is a general perspective view of a micro actuator according to a second embodiment of the present invention.
Figure 6:
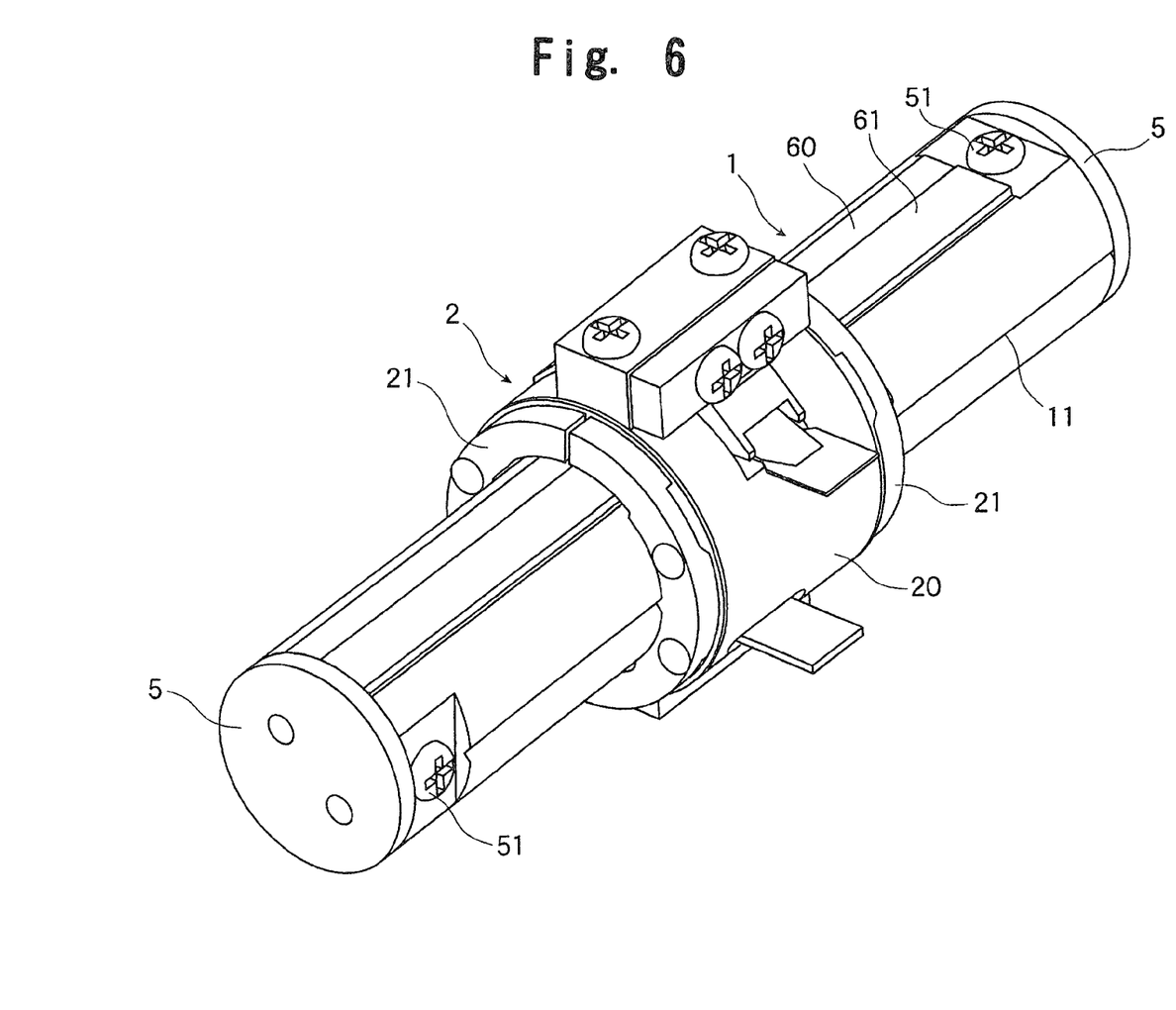
FIG. 6 is a general perspective view, as observed from the back side, of the micro actuator shown in FIG. 5.

FIGS. 5 and 6 show a micro actuator according to the second embodiment of the present invention, in which, as stated above, only one slit opening 14 is formed for the spline shaft 1. FIG. 5 is a general perspective view, and FIG. 6 is a general perspective view as seen from the opposite side.

In FIG. 5, the slit opening 14 extending in the axial direction is provided at one position in the outer peripheral surface of the spline shaft 1, and the spline nut 2 is connected with the forcer 31 constituting the linear motor 3 through the slit opening 14.

Further, as shown in FIG. 6, a flat surface 60 is formed on the outer peripheral surface of the spline shaft at position out of phase with respect to the slit opening by 180°, and a tape-like linear scale 61 is attached to the flat surface 60. As in the first embodiment, the linear scale 61 is formed as a magnet scale. A reading head (not shown) is fixed to the spline nut 2 at a position opposed to the linear scale 61; when the spline nut 2 moves along the spline shaft 1, the reading head outputs pulse signals corresponding to changes in the magnetic poles as it moves along the linear scale 6.

Otherwise, this embodiment is of the same construction as the first embodiment, so, in FIGS. 5 and 6, the components that are the same as those of the first embodiment are indicated by the same reference numerals, and a description thereof will be omitted.

In the micro actuator of the second embodiment, constructed as described above, only one slit opening 14 is formed for the spline shaft 1. As a result, as compared with the first embodiment, the rigidity of the spline shaft 1 is improved, and it is possible to enhance the accuracy in the movement of the spline nut 2; further, the machining of the spline shaft 1 is facilitated, making it possible to produce it at lower cost. Further, since the linear scale 61 is formed as a tape-like component, which is attached to the flat surface 60 provided on the spline shaft 1, the linear scale can be arranged more easily as compared with the wire-like linear scale 33 of the first embodiment, making it possible to enhance the measurement accuracy with respect to the movement of the spline shaft 1.

Figure 7:
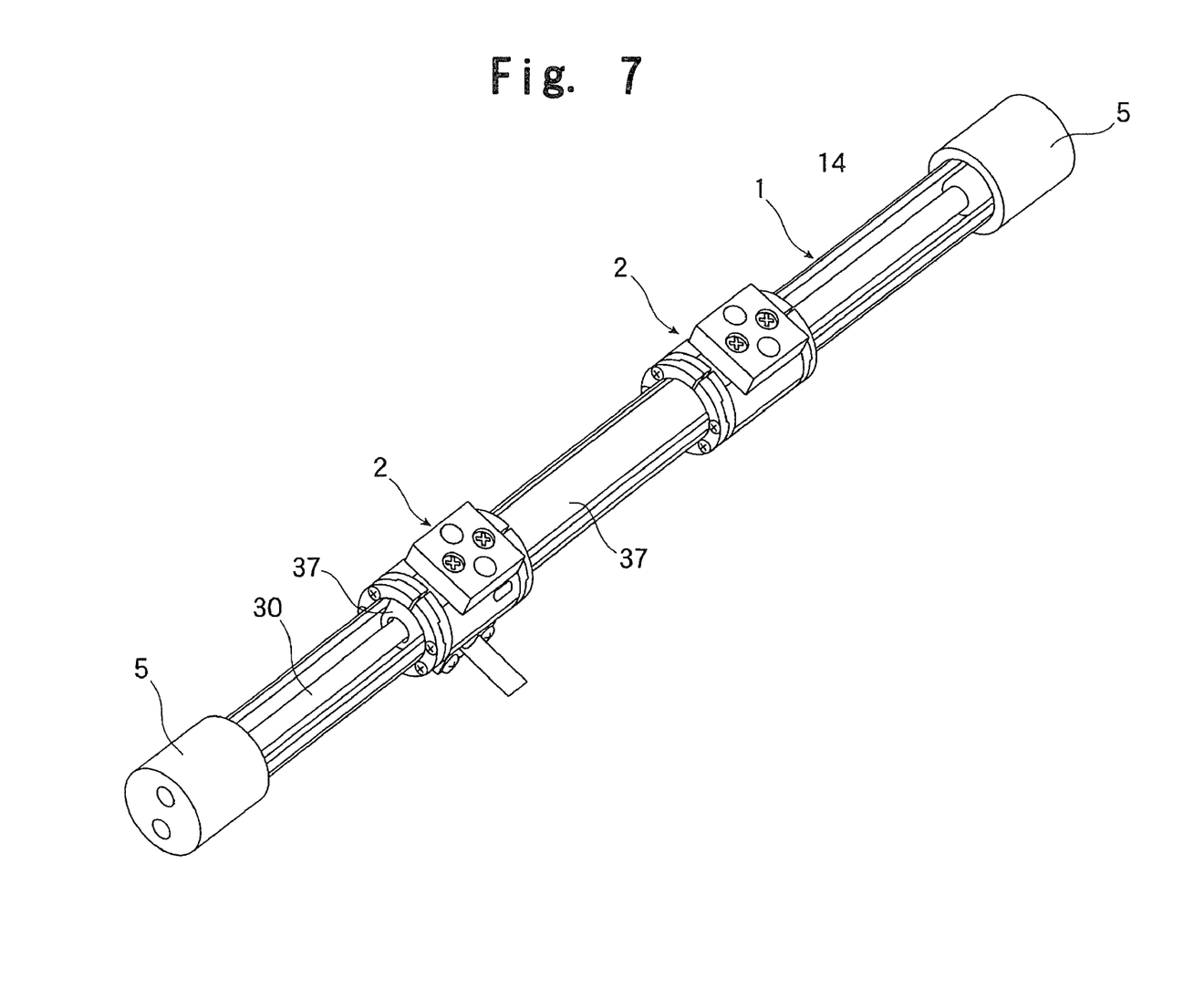
FIG. 7 is a general perspective view of a micro actuator according to a third embodiment of the present invention.

Next, FIG. 7 shows a micro actuator according to the third embodiment of the present invention.

In the micro actuator of the third embodiment, in order to enhance the thrust exerted by the linear motor 3, a plurality of sets of exciting coils, of which each three exciting coils of the three phases constitutes one set, are mounted on a forcer 37 loosely fit-engaged with the magnet rod 30. Thus, the forcer 37 is formed longer in the axial direction of the magnet rod 30 as compared with the forcer 31 of the second embodiment. Further, in order to reliably support the elongated forcer 37, a pair of spline nuts 2 are fit-engaged with the spline shaft 1 at an axial interval, with the spline nuts 2 being respectively connected with the longitudinal ends of the forcer 37. That is, the pair of spline nuts 2 are connected to each other through the intermediation of the forcer 37; when the linear motor 3 is driven, the spline shaft 1 retaining the magnet rod 30 moves relative to the spline nuts 2, with the distance between the spline nuts 2 remaining the same.

Otherwise, this embodiment is of the same construction as the second embodiment, so, in FIG. 7, the components that are the same as those of the second embodiment are indicated by the same reference numerals, and a description thereof will be omitted.

In the micro actuator of the third embodiment constructed as described above, the number of sets of coil groups mounted on the forcer is arbitrarily selected. As a result, it is possible to arbitrarily adjust the thrust for the stroke movement of the spline shaft with respect to the spline nuts, thereby enabling to apply the actuator to various uses. Further, it is only necessary to select the axial length of the spline shaft and of the forcer according to the requisite thrust and the stroke distance of the spline shaft, and there is no need for a change in the basic structure of the spline nut, so the actuator can be produced at low cost and applied to various uses. That is, whether the requisite stroke distance is 50 cm or 1 m, the micro actuator of the present invention provides the advantages of a reduction in the number of components, facilitation of the assembly, and a reduction in production cost.

The invention claimed is:

1. A micro actuator, comprising:
  a spline shaft formed as a cylinder with a hollow part and having an axially extending slit opening;
  a spline nut fit-engaged with the spline shaft and axially guiding the spline shaft;
  a pair of end caps fixed to openings at both ends of the spline shaft;
  a magnet rod supported at both ends within the hollow part of the spline shaft by the end caps; and
  a forcer loosely fit-engaged with a periphery of the magnet rod within the hollow part of the spline shaft to constitute a linear motor together with the magnet rod and connected with the spline nut through the slit opening,
  wherein a linear scale is fixed to the slit opening to extend in a longitudinal direction thereof, and
  wherein a reading head that is inserted into the slit opening and reads the linear scale is fixed to the spline nut.

2. A micro actuator according to claim 1,
  wherein a pair of the slit openings are formed at positions opposed to each other with the hollow part of the spline shaft therebetween, and
  wherein one slit opening connects the forcer and the spline nut with each other, with another slit opening arranging the linear scale.

3. A micro actuator according to claim 1,
  wherein a ball rolling groove is formed in an outer peripheral surface of the spline shaft, and
  wherein the nut member is assembled to the spline shaft through an intermediation of a large number of balls rolling in the ball rolling groove.

4. A micro actuator, comprising:
  a spline shaft formed as a cylinder with a hollow part and having an axially extending slit opening;
  a spline nut fit-engaged with the spline shaft and axially guiding the spline shaft;
  a pair of end caps fixed to openings at both ends of the spline shaft;
  a magnet rod supported at both ends within the hollow part of the spline shaft by the end caps; and
  a forcer loosely fit-engaged with a periphery of the magnet rod within the hollow part of the spline shaft to constitute a linear motor together with the magnet rod and connected with the spline nut through the slit opening,
  wherein an axially extending flat surface, to which a linear scale is fixed, is formed on a part of an outer peripheral surface of the spline shaft, and
  wherein a head for reading the linear scale is fixed to the spline nut.

5. A micro actuator, comprising:
  a spline shaft formed as a cylinder with a hollow part and having an axially extending slit opening;
  a spline nut fit-engaged with the spline shaft and axially guiding the spline shaft;
  a pair of end caps fixed to openings at both ends of the spline shaft;
  a magnet rod supported at both ends within the hollow part of the spline shaft by the end caps; and
  a forcer loosely fit-engaged with a periphery of the magnet rod within the hollow part of the spline shaft to constitute a linear motor together with the magnet rod and connected with the spline nut through the slit opening,
  wherein a pair of spline nuts are fit-engaged with the spline shaft at an axial interval, with the spline nuts being connected to both longitudinal ends of the forcer.

* * * * *